Sept. 22, 1964  H. STAHLECKER  3,149,889
MOVABLE BEARING FOR SPINNING OR TWISTING SPINDLES
Filed Dec. 7, 1959  2 Sheets-Sheet 1

INVENTOR
HANS STAHLECKER

BY Dickey, Craig & Freudenberg
ATTORNEY

Sept. 22, 1964     H. STAHLECKER     3,149,889
MOVABLE BEARING FOR SPINNING OR TWISTING SPINDLES
Filed Dec. 7, 1959                                      2 Sheets-Sheet 2

INVENTOR

HANS STAHLECKER

BY *Dicke, Craig & Freudenberg*

ATTORNEY

United States Patent Office 3,149,889
Patented Sept. 22, 1964

3,149,889
MOVABLE BEARING FOR SPINNING OR
TWISTING SPINDLES
Hans Stahlecker, Haldenstrasse 20, Suessen,
Wurttemberg, Germany
Filed Dec. 7, 1959, Ser. No. 857,668
Claims priority, application Germany Dec. 27, 1958
8 Claims. (Cl. 308—156)

The present invention relates to movable bearings for spindles of spinning or twisting machines which are driven by belts or cords, and in which the neck and foot bearings for each spindle are mounted separately from each other within a common housing.

In order to avoid thread breakage as much as possible, it is a requirement in spinning and twisting spindles that they rotate as centrally as possible within the entire range of speed.

In bearing structures of this type which were known prior to this invention, it was often attempted to fulfill this requirement by applying a strong frictional damping force which was also intended to carry out the centering of the spindle. It has, however, been found that the centering action which may thus be attained is delayed by the frictional damping. This, in turn, means that the steadying effect upon the spindle is delayed, which is very undesirable when the machine passes through the critical speeds, and especially when the operating speed is near a critical speed. If in these prior machines such centering device were omitted, the spindle was frequently insufficiently centered.

It is an object of the present invention to overcome the above-mentioned disadvantages by mounting the foot bearing without any play within a damping device which preferably consists of a spiral spring or a bushing with a thin wall thickness, and which is centrally supported on the inner wall thereof.

Since in such a device no considerable frictional forces will occur which might delay the centering action, this device will produce the centering effect immediately and with certainty as soon as the interfering vibrations or the like will cease.

The centrally guided damping device according to the invention considerably increases the damping action, especially within the critical range of speed, which is very desirable since the deflections will thereby be reduced and the centering effect will be accelerated.

These and other objects, features, and advantages of the present invention will become further apparent from the following detailed description thereof, particularly when the same is read with reference to the accompanying drawings, in which—

FIGURE 4 shows a longitudinal section of a foot bearing and illustrates the arrangement of a centering element made of plastic material which also locks the foot bearing against rotation; while FIGURE 5 shows a centering member which is capable of carrying out small rocking movements.

Figure 1:
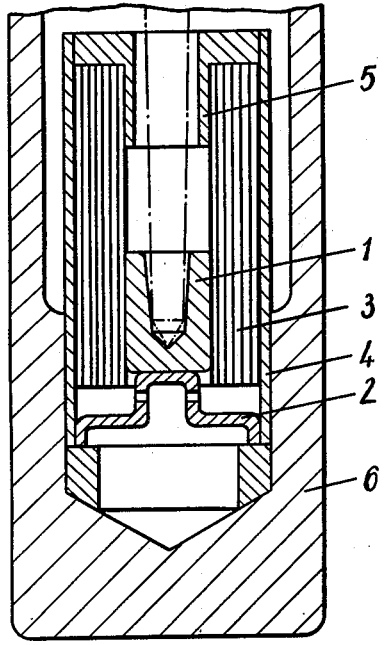
FIGURE 1 shows a longitudinal section of a foot bearing according to the invention which is mounted within a centrally guided spiral spring.

Referring to the drawings, a foot bearing 1 has a flat horizontal bottom surface which rests evenly on the supporting member 2. Foot bearing 1 is mounted without play in a damping element 3 which preferably consists of a spiral spring, which is fitted into a tubular sleeve 4 so that its outer surface engages under tension with the inner wall thereof. The inner surface of damping spring 3 engages with a flanged centering ring 5 which, in turn, is fitted into the tubular member 4. This tubular member 4 which combines the centering ring 5 and damping spring 3, as well as the foot bearing 1 and supporting member 2 into a unit is tightly fitted in a housing 6. Due to centering ring 5, foot bearing 1 will be perfectly centered by the inner surface of damping spring 3, while the inherent frequency of spring 3 will be disturbed by the restraint produced by centering ring 5 upon the movement of the spring so that this frequency can never be built up to act upon the spindle movement.

Figure 2:
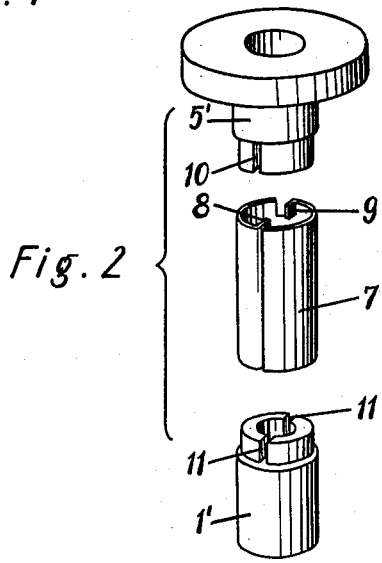
FIGURE 2 shows an exploded perspective view of a manner of locking the bearing against rotation by means of a tubular member.

FIGURE 2 illustrates a coupling tube 7 which may be rolled out of sheet metal and connects the foot bearing 1′ to the centering ring 5′. Although coupling tube 7, being only loosely inserted, does not prevent foot bearing 1′ from moving in radial directions, it does lock the bearing against rotation since tube 7 is provided with an inwardly bent longitudinal edge portion 8 and upper and lower inwardly bent tabs 9 which engage into slots 10 in centering ring 5′ and slots 11 in foot bearing 1′.

Figure 3:
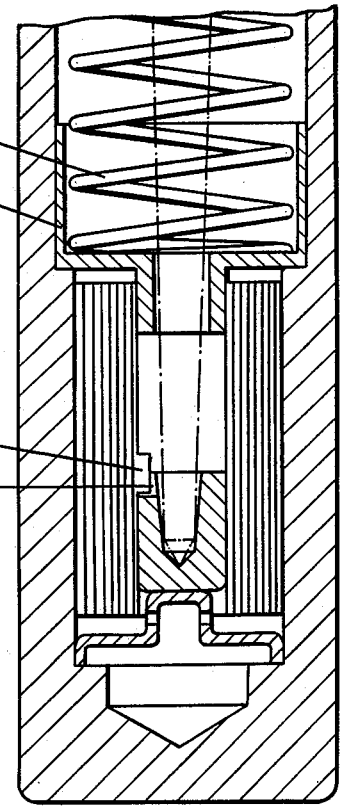
FIGURE 3 shows a manner of locking the foot bearing against rotation by means of a projection on the spiral spring.

FIGURE 3 illustrates a spiral spring, the innermost winding of which is provided with a projecting tab 12 which engages into a recess 13 in the foot bearing which is thus prevented from turning, while the spring is maintained in a fixed position in the downward direction. Centering ring 5″ is held in a fixed position in the spindle housing by a coil spring 16.

Figures 4, 5:
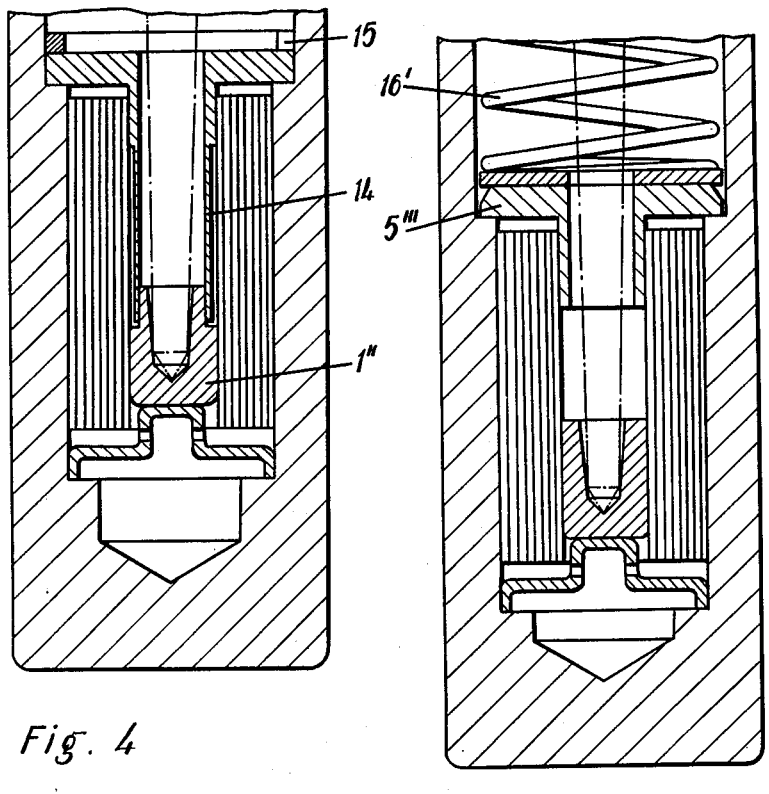

In the further embodiment of the invention according to FIGURE 4, foot bearing 1″ is tightly fitted into a tube 14 which forms an extension of a centering ring which is made of a resilient plastic. Due to the resilience of the plastic tube 14, foot bearing 1″ will still be able to move sufficiently in radial directions. The centering and damping means, as well as the foot bearing and its supporting member are mounted in the spindle housing in the same manner as shown in FIGURE 3, namely, without any special tubular enclosing member. The centering ring will be held in the desired position by a spring ring 15.

The centering ring 5‴ as illustrated in FIGURE 5 will, under normal operating conditions, be held in a fixed position on its support in the spindle housing by a coil spring 16′. Only if very strong out-of-balance forces occur which require considerable vibrational amplitudes within the range of the critical speeds, centering ring 5‴ will be able to carry out small rocking movements from its lower edge in the upward direction against the action of spring 16′, and will thus allow the rotating spindle a greater freedom of movement.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A movable bearing for a spindle of a spinning machine or the like comprising a housing, a foot bearing mounted within said housing, an oscillation dampening and spindle centering element at least partially surrounding said foot bearing and retaining the same substantially without play in relation to the inner surface of said element, means for centrally supporting one end of said element by engaging the inner wall of said element, said last-mentioned means being spaced from said foot bearing in the axial direction thereof, and means for maintaining said last-mentioned means in a normally fixed position within said housing during normal operating oscillation of said bearing.

2. A movable bearing as defined in claim 1, wherein said last-mentioned means for centrally supporting one end of said element includes an essentially annular disk portion having an essentially centrally located depending portion extending therefrom into said one end of said oscillation dampening and spindle centering element, said depending portion being axially spaced from said bearing.

3. A movable bearing for a spindle of a spinning or twisting machine adapted to be driven by a belt or cord comprising a housing, a foot bearing mounted within said housing, an oscillation dampening and spindle centering element at least partly surrounding said foot bearing and retaining the same substantially without play in relation to the inner surface of said element, and means for central supporting one end of said element on the inner wall of said element, said last-mentioned means being spaced from said foot bearing in the axial direction thereof, said element comprising a spiral spring, said foot bearing having a recess therein, said spiral spring having an inwardly extending projection thereon engaging into said recess in said foot bearing for maintaining said spring in a fixed position in the downward direction and for preventing said foot bearing from turning.

4. A movable bearing for a spindle of a spinning or twisting machine adapted to be driven by a belt or cord comprising a housing, a foot bearing mounted within said housing, an oscillation dampening and sipndle centering element at least partly surrounding said foot bearing and retaining the same substantially without play in relation to the inner surface of said element, means for centrally supporting one end of said element on the inner wall of said element, said last-mentioned means being spaced from said foot bearing in the axial direction thereof, and means for resiliently mounting said last-mentioned means within said housing.

5. A movable bearing for a spindle of a spinning or twisting machine adapted to be driven by a belt or cord comprising a housing, a foot bearing mounted within said housing, an oscillation dampening and spindle centering element at least partially surrounding said foot bearing and retaining the same substantially without play in relation to the inner surface of said element, means for centrally supporting one end of said element at the inner wall of said element, said last-mentioned means being spaced from said foot bearing in the axial direction thereof, said last-mentioned means including a centering ring, and means engaging said centering ring for maintaining the same normally in a fixed position within said housing.

6. A movable bearing for a spindle of a spinning or twisting machine adapted to be driven by a belt or cord comprising a housing, a foot bearing mounted within said housing, an oscillation dampening and spindle centering element at least partly surrounding said foot bearing and retaining the same substantially without play in relation to the inner surface of said element, means for centrally supporting one end of said element on the inner wall of said element, said last-mentioned means being spaced from said foot bearing in the axial direction thereof, said last-mentioned means including a centering ring, and spring means acting upon said centering ring for maintaining the same normally in a fixed position within said housing.

7. A movable bearing as defined in claim 6, in which said centering ring includes portion substantially in contact with said housing, and in which said spring means include coil spring means.

8. A movable bearing for a spindle of a spinning machine or the like, comprising a housing, a foot bearing mounted within said housing, an oscillation dampening and spindle centering coil spring at least partially surrounding said foot bearing adjacent one end of said spring and retaining said foot bearing substantially without play in relation to the inner coil of said spring, means for centrally supporting the other end of said spring including means tightly engaging within the inner coil of said spring and provided with essentially centrally located recess means surrounding a portion of said spindle, said recess means being of a diameter greater than the diameter of said portion, and means for maintaining said centering means in a normally fixed position during operation of the apparatus.

References Cited in the file of this patent

UNITED STATES PATENTS

| | | |
|---|---|---|
| 2,285,681 | Rushing | June 9, 1942 |
| 2,350,272 | Cobb | May 30, 1944 |
| 2,757,992 | Schmid | Aug. 7, 1956 |
| 2,969,262 | Staufert | Jan. 24, 1961 |

FOREIGN PATENTS

| | | |
|---|---|---|
| 728,086 | Great Britain | Apr. 13, 1955 |